United States Patent
Johnson

[15] 3,700,369
[45] Oct. 24, 1972

[54] STRIPPER FOR BLOW MOLDING MACHINE
[72] Inventor: Joseph A. Johnson, Brigantine, N.J.
[73] Assignee: Jomar Industries, Inc., Brigantine, N.J.
[22] Filed: Aug. 24, 1970
[21] Appl. No.: 66,307

[52] U.S. Cl. .................. 425/139, 425/326, 425/444, 425/387, 425/397
[51] Int. Cl. ............................................. B29f 1/14
[58] Field of Search ........ 18/5 BJ, 5 BP, 5 BR, 5 BM, 18/5 BP, 20 B, 2 RM, 2 RP, 30 CS, DIG. 45

[56] References Cited

UNITED STATES PATENTS

| | | | |
|---|---|---|---|
| 3,100,913 | 8/1963 | DeMatteo | 18/5 BJ |
| 3,081,486 | 3/1963 | Skvorc | 18/2 RP |
| 2,444,339 | 6/1948 | Dinzl | 18/DIG. 45 |
| 2,649,943 | 8/1953 | Meyers | 18/DIG. 45 |
| 2,167,724 | 8/1939 | Murphy et al. | 18/2 RM X |
| 2,848,770 | 8/1958 | Schuchardt | 18/2 RM X |
| 2,923,976 | 2/1960 | Strauss | 18/2 RP X |
| 2,954,584 | 10/1960 | Groves | 18/2 RP X |
| 3,570,058 | 3/1971 | Heinig et al. | 18/5 BR |

Primary Examiner—J. Spencer Overholser
Assistant Examiner—Michael O. Sutton
Attorney—Stowell & Stowell

[57] ABSTRACT

A stripper mechanism for an automatic blow molding apparatus having a rotatable turret carrying plural sets of parison pins for forming molded articles. A set of stripper fingers project between the formed article carrying pins at an ejection station and are reciprocated parallel to the pins to strip formed articles therefrom. The span of stroke of the stripper fingers is adjustable and the fingers can be lowered to provide operation of the apparatus without an automatic stripping step. The mechanism includes a device for checking the condition of the pins after the stripping step.

8 Claims, 6 Drawing Figures

INVENTOR
JOSEPH A. JOHNSON

BY Stowell & Stowell

ATTORNEYS

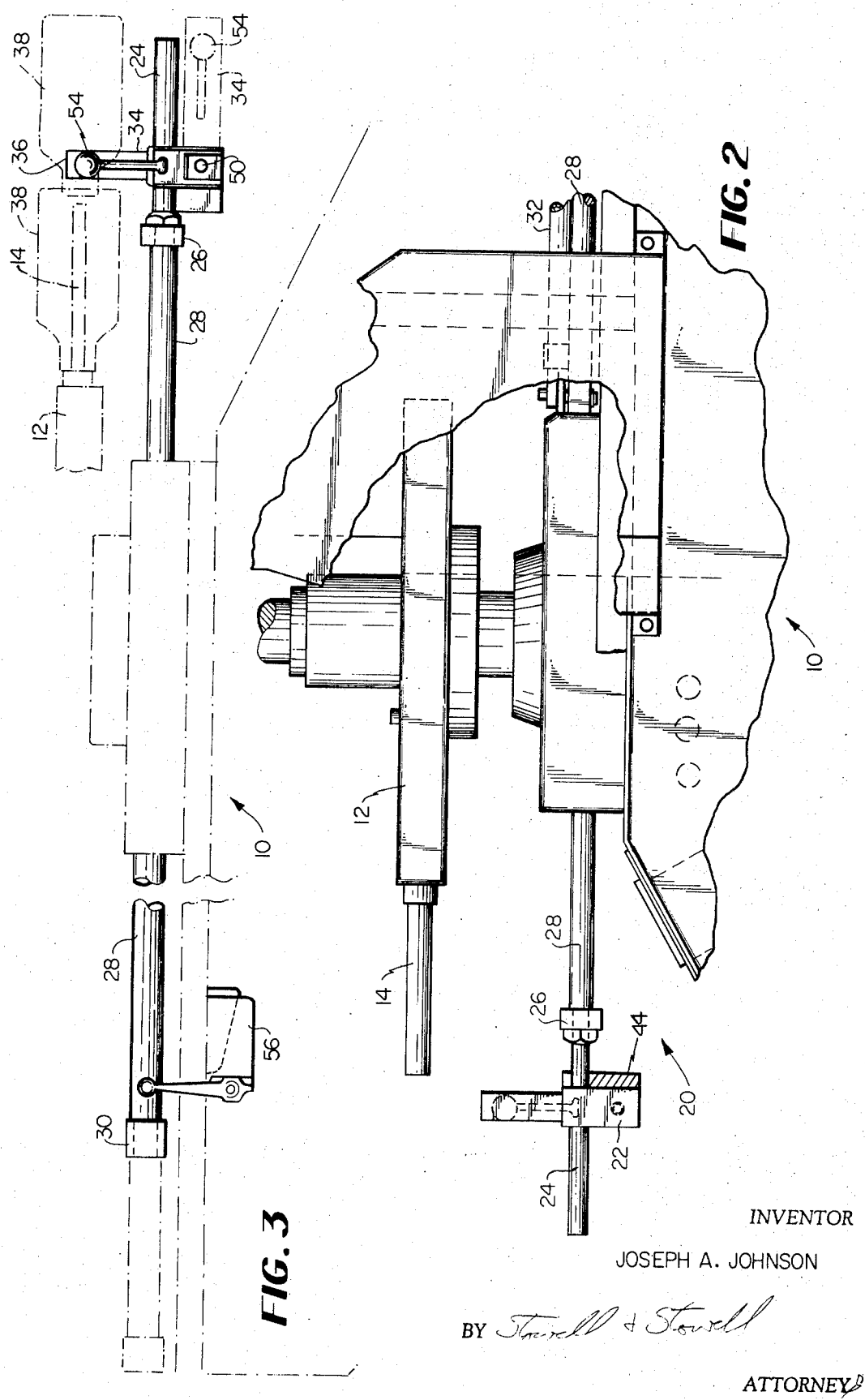

INVENTOR
JOSEPH A. JOHNSON

BY
ATTORNEY

STRIPPER FOR BLOW MOLDING MACHINE

BACKGROUND OF THE INVENTION

1. Field of the Invention improvements

The present invention generally appertains to improvements in injection blow molding machines for automatically forming hollow articles, such as bottles, from plastic materials and more particularly relates to new and novel improvements in a stripper mechanism for multiple station injection blow molding machines.

2. Description of the Prior Art

Injection blow molding machines that automatically operate to form a number of hollow articles, such as bottles, from plastic materials are fairly common in the art and in industrial usage. A machine of the type involved is more fully described in applicant's co-pending application Ser. No. 52,811, filed July 7, 1970. Such a machine has a number of operating stations surrounding a horizontally disposed elevatable and rotatable turret which has side faces carrying distinct sets of parison pins. The turret is surrounded by the angularly placed stations which include parison mold stations, blow mold stations and ejection stations. The turret is indexed from the parison mold stations, to the blow mold stations and then to the ejection stations to cause the parison pins to operatively successively occupy such stations with all stations being simultaneously operative.

Each parison mold station is composed of separable mold halves with the bottom halves being fixed and the movable upper halves being carried by rams which clamp the mold halves together about the parison pins. An injection unit injects plastic melt into the closed parison molds around the parison pins to a preset pressure after which the parison molds are opened.

The turret is then raised to lift the pins from the bottom mold halves and the turret is indexed to bring the parisons to the blow mold stations where the parisons are located in blow molds. With the parisons located in the blow molds pressurized air is passed through the parison pins to inflate the parisons to the configuration and size determined by the interior shape and size of the blow molds.

On completion of the blow molding, the turret is rotated in the same direction to bring the parison pins to the ejection stations where the formed articles are removed from the pins.

A problem which has been encountered with the prior art in connection with the ejection of the formed articles from the pins at the ejection station since pressurized air is used to blow the articles from the pins. This use of pressurized air tends to result in a slow ejection and also such ejection is not fully dependable when the articles sometimes become stuck on the pins.

SUMMARY OF THE INVENTION

The present invention provides a machine that overcomes and eliminates the problems of known machines and that operates at a dependably fast production rate.

Consanant with such objects another object of the present invention is to provide such a machine with mechanical means for positively stripping the formed articles from the pins at the ejection station which means can be lowered to provide operation of the machine without automatic stripping of formed articles at the ejection station.

The invention also provides means to detect malfunction of the stripping means and/or damage to the parison pins by furnishing a detector automatically stopping the machine when formed articles remain on the pins after the stripping operation or a misalignment of the pins is detected after stripping.

The invention also furnishes means to adjust the machine for articles of various sizes by providing means to vary the length and span of stroke of the stripping mechanism.

In a preferred embodiment, the invention comprises stripper fingers projecting between the parison pins in the ejection station of an automatic blow molding apparatus; reciprocating means to move the fingers outwardly parallel to the axes of the pins; means to vary the travel of the fingers; and means to lower the fingers from between the pins to provide operation of the molding apparatus without automatic stripping of the pins.

These and other objects and attendant advantages of the invention will become better understood by those skilled in the art by reference to the following detailed description when viewed in light of accompanying drawings wherein like components throughout the Figures are indicated by like numerals and wherein:

BRIEF DESCRIPTION OF THE DRAWINGS

FIG. 2 is an enlarged sectional view of the device of FIG. 1 taken along the lines 2—2 thereof;

FIG. 3 is a side elevational view of a portion of the stripping device of FIG. 1;

DESCRIPTION OF THE PREFERRED EMBODIMENT

Figure 1:
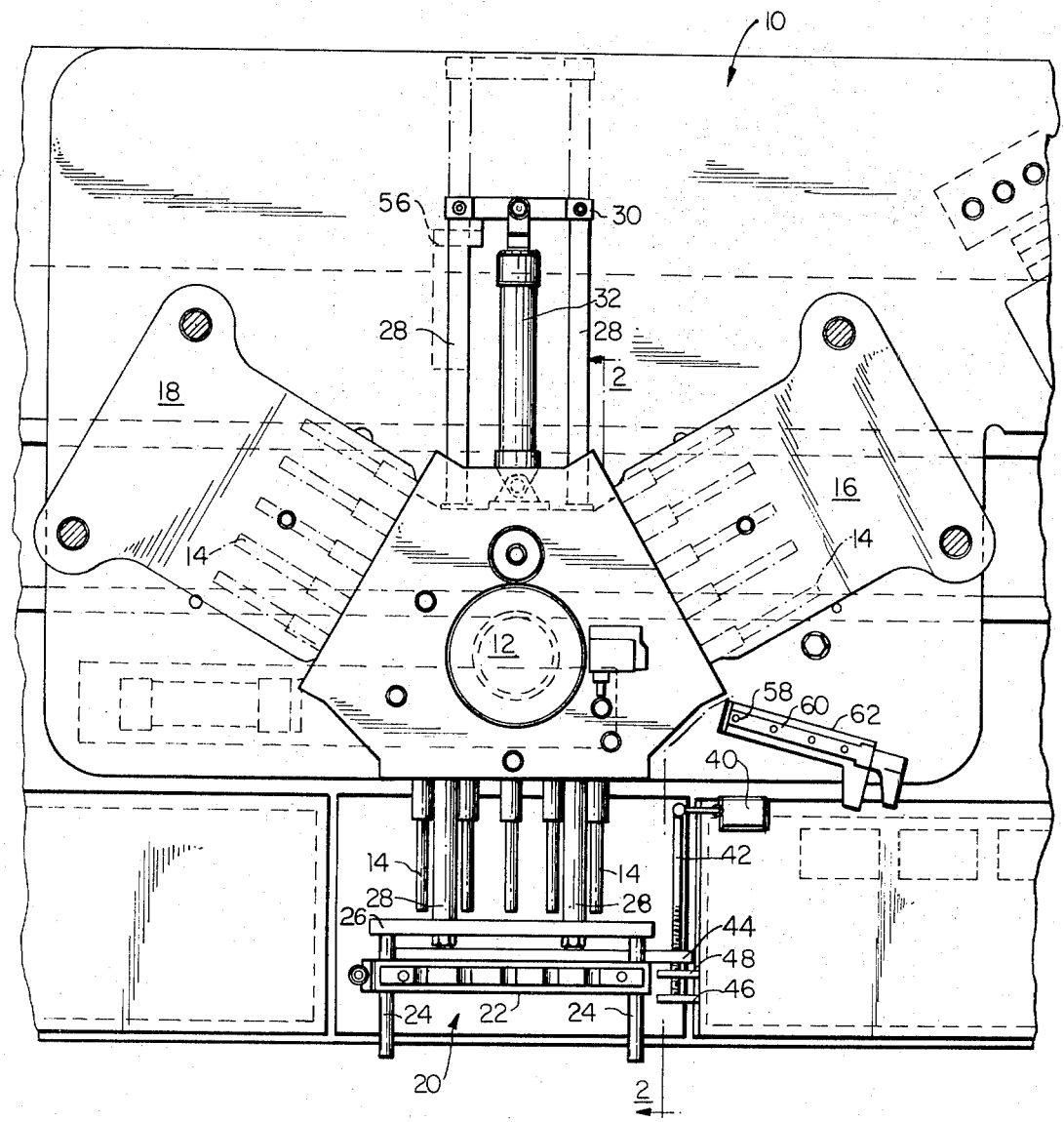
FIG. 1 is a fragmentary plan view of a blow molding apparatus incorporating a stripping device in accordance with the invention.

In FIGS. 1 and 2 a blow molding apparatus or machine is generally shown at 10. As indicated above, the general operation of machines of this type is more fully described in applicant's cited co-pending application and it will suffice, for purposes of understanding this invention, to indicate that the device described herein comprises a rotatable and elevatable turret 12 which has three faces spaced 120° apart with sets of outwardly extending parison pins 14 on each face. Although the device described in the cited co-pending application comprises a turret having double the number of faces and operating stations, the functioning of the machines are essentially the same for the purposes of this invention.

Surrounding the turret 12 are, in counter clockwise order, a preform parison mold station 16, a blow mold station 18 and an ejection station generally indicated at 20.

As is more fully described in the cited co-pending application, the mold stations 16 and 18 include horizontally divide seperable mold halves which are separated vertically to allow the pins and molded articles thereon to clear the cavities in the mold halves when the turret 12 is raised as seen in FIG. 2 and rotated by indexing means (not shown). The turret 12 then can be indexed between stations 14, 16 and 18 in sequence or in any other order as found suitable. At each indexed point the mold halves are closed by actuating means (not shown) to define cavities about the ends of the pins indexed at that station.

With the mold halves closed about the pins 14 at the parison mold station 16, heated plastic material from an injection unit (not shown) is injected into the cavities thereof to form parisons on the ends of the pins 14.

The mold halves are then opened and the turret 12 is indexed to place the pins 14 carrying the parisons at the blow mold station 18 whereupon the blow mold halves are closed about the parisons which are then expanded to assume the form and size of the cavity under air pressure directed through the parison pins 14.

After separation of the blow mold halves, the turret 12 is indexed again to place the molded articles at the ejection station 20 for stripping as will be described in greater detail below. After stripping, the cycle is repeated. The parison pins 14 on the remaining faces of the turret are, of course, indexed at adjacent stations so that for each of the above described cycles, the other phases of the formation are simultaneously being carried out.

Although a machine operating as described above is preferred, it should be understood that this invention may be incorporated in any blow molding machine from which plural articles formed on parison pins must be stripped.

The ejection station 20 includes a stripper mount 22 (FIG. 2) which is slidably disposed on a pair of supporting bars 24. The bars 24 are interconnected by a cross member 26 which in turn is connected to a pair of parallel stripper actuating arms 28. As best seen in FIG. 1, the arms 28 are interconnected, at their other ends, by a yoke 30. A hydraulic actuator 32, connected to the frame of the machine 10 at one end and the mid portion of the yoke 30 at the other end, longitudinally drives the arms 28 to reciprocate the stripper mount 22.

Figure 4:
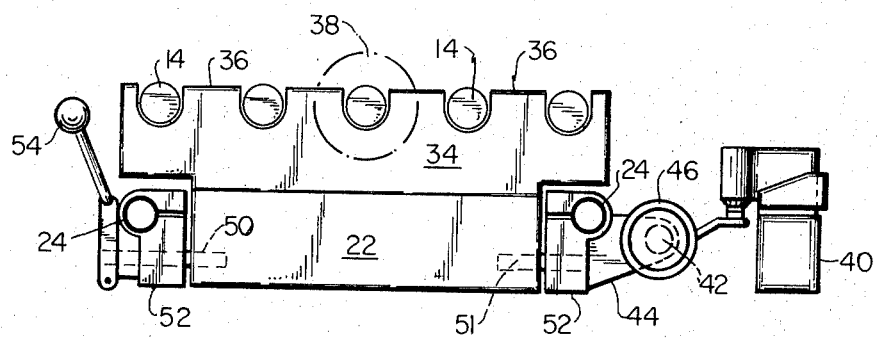
FIG. 4 is an end view of the device of FIG. 3.

Referring now more specifically to FIGS. 3 and 4, a stripper bar 34 is shown disposed on the mount 22 and is provided with plural recesses in the upper edge to define a series of stripper fingers 36 which extend upwardly between the parison pins 14. A molded article to be stripped, shown in phantom at 38, is disposed on one of the pins 14 for purposes of illustration.

The stripper bar 34 is preferably removably attached to the stripper mount 22 so that it may be interchanged to accommodate various configurations of molded articles.

As best seen in FIGS. 1 and 4, a microswitch 40 is disposed on the frame of the machine 10 and is engaged by a threaded stop rod 42 which is mounted to the stripping mount 22 by a threaded collar 44. The microswitch is connected to a control system (not shown) for the actuator 32 and serves to, when engaged, provide a limit to movement of the stripper mount toward the machine 10. An adjustment wheel 46 and lockwheel 48, disposed on the rod 42, serve to longitudinally adjust the rod so that the point of engagement with the switch 40 can be varied for purposes to be described below.

The stripper mount 22 is pivotally mounted on pins 50 and 51 to split clamp ends 52 which encompass the support bars 24 and provide means to adjust the position of the stripper mount 22 along the length of the bars. The pin 50 is provided with a handle 54 on the outer end thereof which provides means to lower the stripper fingers to a horizontal position as shown in phantom in FIG. 3. The support may be held vertical by a detent or other means common in the art.

In FIG. 3, a second microswitch 56 is disposed on the machine 10 proximate the other end of the actuating arms 28 and is mounted to be engaged by the yoke 30. Like microswitch 40, the microswitch 56 is connected to the control system for the actuator 32 and serves to limit the travel of the stripper mount 22 away from the machine 10.

In operation, and with particular reference to FIGS. 3 and 4, the stripper bar 34 is selected according to the cross sectional configuration of the neck of the article 38 and mounted on the mount 22. The mount 22 is then longitudinally adjusted on the support bars 24 so that the fingers 36 clear the end of the parison pins 14 when the actuating arms 28 are fully extended against the switch 56. The adjustment wheel 46 is then turned so that the stop rod 42 actuates the switch 40 when the fingers 36 are coincident with the neck of the article 38 when it is fully in place on the pin 14.

In start up of the machine 10, it is often necessary to make test runs until the temperature of the plastic material and other parameters are suitable. During such start up runs, the molded articles produced are generally imperfect and/or non-uniform and require manual removal from the pins. At such times, it is preferable that the automatic stripping step be bypassed until such test runs are completed. The pivotal mounting of the stripper mount 34 serves to provide means to lower the fingers 36, as described above, for this purpose. With the fingers lowered the machine 10 may be run without the automatic stripping step until the molded article output is satisfactory.

Figure 5:
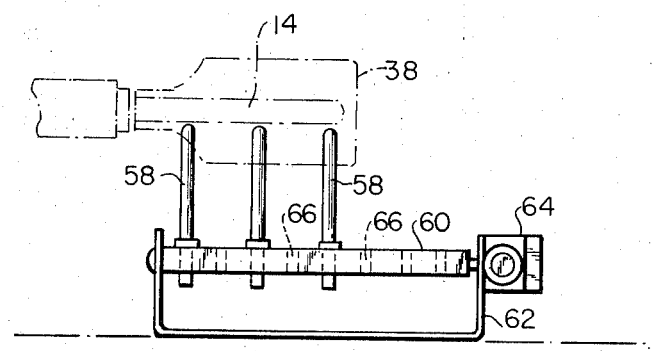
FIG. 5 is an elevational view of a portion of the apparatus of FIG. 1.
Figure 6:
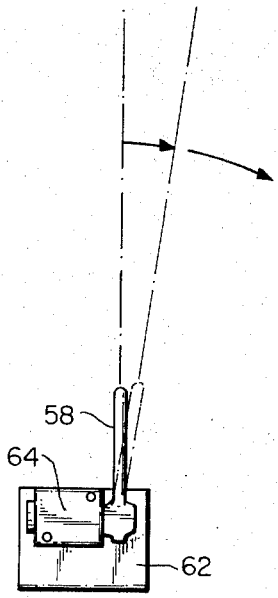
FIG. 6 is a side view of the portion of FIG. 5.

With reference now to FIGS. 5 and 6, means are provided to sense incomplete stripping of the pins 14 or damaged and bent pins. Such means comprise feeler fingers 58 mounted in a rocker bar 60 on a bracket 62 adjacent the stripper station 20 (FIG. 1). A microswitch 64, connected to the machine control (not shown) serves to stop the machine operation if the fingers 58 are deflected as shown in FIG. 4.

If an article 38 were to remain on one or more of the pins as seen in phantom in FIG. 5, or if one or more of the pins 14 were to be bent downwardly, the obstruction would engage the fingers 58 as the turret 12 is indexed by the fingers from the ejection station 20 to the parison mold station 16 thereby stopping the machine until the situation is corrected.

The fingers 58 are mounted on the bar 60 in selected ones of a series of spaced vertical holes 66 in the bar. By proper selection of the length of the fingers 58 and their lateral position on the bar 60, the feeler mechanism can be adjusted to various configurations of molded articles.

What has been set forth above is exemplary to enable those skilled in the art in the practice of the invention.

What is new and desired to be protected by Letters Patent of the United States is:

1. In a blow molding apparatus for forming hollow articles including a rotatable turret having plural side faces with sets of parison pins projecting outwardly therefrom, spaced operating stations including at least one ejection station disposed therearound and means for indexing said turret to place pin sets with formed articles thereon at said ejection station, the improvement comprising mechanical means including stripper fingers projecting between said pins to engage formed articles thereon and reciprocating means to move the fingers outwardly parallel to the pins to strip articles formed thereon therefrom, stroke adjusting means including stop means adjustable along the path of movement of said fingers to vary the span of stroke of said fingers, and means to lower said fingers from between said pins to bypass the automatic stripping function thereof.

2. An apparatus in accordance with claim 1 further including feeler means adjacent said ejection station to detect the condition of said pins when said turret is indexed to move said pins from said ejection station.

3. In a blow molding apparatus for forming hollow articles including a rotatable turret having plural side faces with sets of parison pins projecting outwardly therefrom, spaced operating stations including at least one ejection station disposed therearound and means for indexing said turret to place pin sets with formed articles thereon at said ejection station, the improvement comprising mechanical means including stripper fingers projecting between said pins to engage formed articles thereon and reciprocating means to move the fingers outwardly parallel to the pins to strip articles formed thereon therefrom, stroke adjusting means including stop means adjustable along the path of movement of said fingers to vary the span of stroke of said fingers, and means to lower said fingers from between said pins to bypass the automatic stripping function thereof, further including feeler means adjacent said ejection station to detect the condition of said pins when said turret is indexed to move said pins from said ejection station, wherein said feeler means comprises a plurality of upwardly extending fingers disposed on a rocker arm, said fingers being configured to be normally cleared by unincumbered pins when indexed thereby but deflected thereby when said pins are not cleared or are out of alignment, and switch means to interrupt operation of said apparatus and disposed to be actuated by said rocker arm when said fingers are deflected.

4. An apparatus in accordance with claim 3 wherein said rocker arm is provided with openings for receiving said feeler fingers at spaced points therealong, whereby the position of said feeler fingers along said rocker arm can be altered to correspond to varying molded article configurations.

5. An apparatus in accordance with claim 1 wherein said stop means include first and second microswitches adjacent said reciprocating means and connected thereto to interrupt operation thereof when actuated, said first switch being disposed adjacent said fingers to limit movement of said reciprocating means toward said apparatus when engaged by said fingers and actuated, said second switch being disposed to limit movement of said reciprocating means away from said apparatus when engaged thereby and actuated.

6. In a blow molding apparatus for forming hollow articles including a rotatable turret having plural side faces with sets of parison pins projecting outwardly therefrom, spaced operating stations including at least one ejection station disposed therearound and means for indexing said turret to place pin sets with formed articles thereon at said ejection station, the improvement comprising mechanical means including stripper fingers projecting between said pins to engage formed articles thereon and reciprocating means to move the fingers outwardly parallel to the pins to strip articles formed thereon therefrom, stroke adjusting means including stop means adjustable along the path of movement of said fingers to vary the span of stroke of said fingers, and means to lower said fingers from between said pins to bypass the automatic stripping function thereof, said stop means include first and second microswitches adjacent said reciprocating means and connected thereto to interrupt operation thereof when actuated, said first switch being disposed adjacent said fingers to limit movement of said reciprocating means toward said apparatus when engaged by said fingers and actuated, said second switch being disposed to limit movement of said reciprocating means away from said apparatus when engaged thereby and actuated, wherein said reciprocating means includes at least one support bar disposed parallel to said pins and said stroke adjusting means includes a stripper mount adjustably disposed on said support bar, said mount supporting said fingers and having a longitudinally adjustable stop rod associated therewith parallel to said pins and positioned to engage said first microswitch, whereby adjustment of the position of said mount on said support bar to clear the free ends of said pins with said reciprocating means extended fully away from said machine and adjustment of said stop rod to actuate said first microswitch when said fingers are coincident with the other ends of said pins with said reciprocating means disposed toward said machine provides adjustment of the span of stroke of said fingers.

7. An apparatus in accordance with claim 1 wherein said means to lower said fingers includes a pivotal mount supporting said fingers for pivoting thereof on an axis perpendicular to and in the common plane of said fingers.

8. A mechanism in accordance with claim 1 wherein said reciprocating means and said stroke adjusting means include at least one support bar disposed parallel to said pins and a stripper mount adjustably disposed on said bar, said mount supporting said fingers and having a longitudinally adjustable stop rod associated therewith parallel to said pins, first and second microswitches associated with said reciprocating means to limit movement thereof toward and away from said one end of said pins respectively, said first microswitch being disposed to be engaged by said stop rod for actuation thereby.

* * * * *